United States Patent [19]

Barabas et al.

[11] 3,929,739

[45] Dec. 30, 1975

[54] NOVEL FLOCCULENT TERPOLYMERS

[75] Inventors: Eugene S. Barabas, Watchung; Frederick Grosser, Midland Park, both of N.J.

[73] Assignee: GAF Corporation, New York, N.Y.

[22] Filed: Nov. 12, 1973

[21] Appl. No.: 414,810

[52] U.S. Cl. .................... 260/78.5 B; 260/29.6 TA; 260/29.6 HN; 260/80.7; 260/80.72; 260/80.73
[51] Int. Cl.² ................ C08F 220/18; C08F 220/40; C08F 220/54; C08F 220/56
[58] Field of Search .......... 260/78.5 B, 80.7, 80.73, 260/80.72, 29.6 TA, 29.6 HN

[56] References Cited
UNITED STATES PATENTS

| | | | |
|---|---|---|---|
| 3,014,896 | 12/1961 | Colwell et al. | 260/80.3 |
| 3,171,805 | 3/1965 | Suen et al. | 210/54 |
| 3,661,868 | 5/1972 | Barron | 260/80.3 N |

*Primary Examiner*—John Kight, III
*Attorney, Agent, or Firm*—Walter C. Kehm

[57] ABSTRACT

Interpolymers consisting of acrylamide, dimethylaminomethyl acrylamide and a third ethylenically unsaturated monomer of lower solubility in water than the other monomers; which interpolymers are useful as flocculents.

11 Claims, No Drawings

NOVEL FLOCCULENT TERPOLYMERS

The present invention relates to water-soluble, high molecular polymers of acrylamide, dimethylamino-methyl acrylamide and a third ethylenically unsaturated monomer. More particularly, this invention relates to terpolymers prepared by polymerization of acrylamide, dimethylamino-methyl acrylamide and a third ethylenically unsaturated monomer of lower solubility in water than the remaining monomers in the terpolymer mixture.

The terpolymers of the invention have excellent flocculating properties and have proven completely satisfactory as retention aids and water purification aids.

It is an object of the present invention to prepare terpolymers of acrylamide, dimethylamino-methyl acrylamide and a third ethylenically unsaturated monomer which terpolymers have optimum flocculating activity.

It is a further object of this invention to provide such termpolymers in a simple and economically feasible manner.

Still another object of this invention is to provide such terpolymers which can be easily and satisfactorily stored and handled.

These and other objects and advantages of the invention will become apparent from a consideration of the following disclosure.

This application is a continuation in part of Ser. No. 190,404 filed Oct. 18, 1971, the entire disclosure of which is incorporated herein by reference.

It has been discovered in accordance with the present invention that terpolymers consisting of acrylamide, dimethylamino-methyl acrylamide and a third ethylenically unsaturated monomer have excellent flocculating properties and can be easily stored and handled. The termpolymers of the invention are characterized by their low sheer-viscosities (Brookfield viscosity) below 10,000 cps, and more usually between 1,500 and 60 cps, which is most surprising because of their kinematic (flow) viscosities which are very high due to their molecular weights in excess of 30,000, more often in the range of 70,000 to 900,000*. Thus, the polymers of this invention are low viscosity products of high molecular weight, which combination of properties is not entirely understood but which is postulated as resulting from the presence of the third member of the terpolymer system. The presence of the termonomer in the polymer chain produces a tightly coiled structure due to its relatively low solubility. As a consequence, the terpolymer occupies a relatively small area of the total volume of the system. With more hydrophilic monomers, the coils are expanded and the resulting polymer is more viscous. Since flocculents are usually added to mixtures in very small amounts, e.g., as low as a few parts per million, solutions of the flocculent are employed to control concentration in the mixture. Most of the flocculents previously employed which have displayed high activity, are extremely viscous and, therefore, difficult to dissolve in solutions or handle in storage. The present terpolymers combine the advantages of high activity and low viscosity and are comparatively inexpensive to manufacture and easy to handle.

* For the purposes of the present invention, the molecular weight referred to herein is intended to be the number average molecular weight.

The concentrations of monomers in the terpolymer in weight percent which have been found to provide polymers of optimum flocculating activity are as follows:

| | |
|---|---|
| acrylamide: | 20–50% (preferably 25–34%) |
| dimethylamino-methyl acrylamide: | 45–75% (preferably 55–70%) |
| termonomer: | 5–25% (preferably 5–9%) |

The preferred termonomers are those which have relatively low solubility in water and comprise principally acrylonitrile, vinyl acetate, vinyl-isobutylether, chloroprene, dimethylmaleate, diethylmaleate, allylacetate, methylacrylate, ethylacrylate, methyl methacrylate and 2-vinyl pyridine. The most preferred termonomers are methyl methacrylate and ethylacrylate.

The terpolymers of this invention are prepared by polymerization in aqueous media in which the termonomer is soluble in a relatively low and limited extent but in which the terpolymer is soluble. The formation of the polymer solution is considered to be necessary in order to provide the water soluble, high molecular weight polymers suitable for use as retention and flocculant aids. The monomers may be introduced into the reaction zone in an admixture of two or three monomers or they can be introduced individually, preferably in solutions. The concentrations of the monomers in the aqueous medium are between 0.01 weight percent and the saturation limit of the monomer.

The dimethylamino-methyl acrylamide can be prepared for use as a monomer by conventional methods or, alternatively, the dimethylamino-methyl acrylamide can be prepared in situ by using acrylamide as a comonomer and converting a portion therof to dimethylamino-methyl acrylamide according to the Mannich reaction.

The catalysts employed for the polymerization of the acrylamide, dimethylamino-methyl acrylamide and third ethylenically unsaturated monomer is a free radical generating catalyst. A large variety of free radical catalysts may be employed, such as the peroxides or azo type polymerization catalysts. The polymerization is preferably carried out with t-butylperoxy pivalate as the catalyst.

Generally, the polymerization is effected at a temperature between about 40°C. and about 100°C. However, in order to avoid "run-away" reactions and to obtain the desired molecular weight, ie., greater than 30,000 and up to a million and higher, it is preferred to initiate the polymerization reaction at as low a temperature as is possible and to also employ cooling, if necessary, to prevent the temperature generated by the exothermic nature of the reaction from rising above 90°C. The polymerization is preferably carried out in the substantial absence of oxygen and also preferably, under a blanket of an inert gas such as nitrogen and at atmospheric pressure or slightly above, up to 500 p.s.i.g.

The molecular weight of the terpolymer may be regulated by the addition of chain transfer agents, such as, for example, isopropanol.

The polymer is discharged from the reactor and is used as a solution thereof. The polymer following its discharge may be further treated for separation of foreign particles. Such treatment is recommended when a solution of the terpolymer is to be used as a flocculent in the manufacture of paper; although for treatment of sewage and the like, such after treatment is not necessary. When the separation of foreign particles is desired, the terpolymer solution is passed through a 200 mesh stainless steel screen or other suitable separation device. A pressure filter and a pressure of about 4 p.s.i.g. may be used to remove dirt or gel particles, etc.

In accordance with the invention, it has been further found that the pH range of flocculating activity of the terpolymer can be increased by quaternizing the terpolymer. The corresponding quaternized compounds are obtained by reacting the terpolymer with a quaternizing agent, such as an alkyl or aryl halide, sulfate or the like, at a temperature between about 15°C. and about 100°C. under atmospheric pressure or pressure up to about 600 p.s.i.g., depending on the quaternizing agent employed. Examples of preferred quaternizing agents are the chlorides and sulfates of $C_1$ to $C_3$ hydrocarbons and methyl chloride is the most preferred.

The following examples are given in order to fully illustrate the invention, but are in no way to be construed as limitative of the scope thereof. All parts and percentages herein are by weight unless otherwise indicated.

EXAMPLE 1

There were introduced into a 5 liter reaction flask equipped with a mechanical stirrer, reflux condenser, thermometer and dropping funnel, 496 g., as a 25 percent solution, of dimethylaminomethyl acrylamide, 186 g. of acrylamide, 44 g. methyl methacrylate, 740 g. distilled water and 100 g. isopropanol. The system was thoroughly purged with nitrogen and agitated until the reaction mixture was entirely clear. Thereafter, 1.75 g. of azo-bis-isobutyronitrile were introduced and the reaction mixture heated to 70°C. The reaction mixture was then stirred for 1 hour at this temperature. There were then introduced through the dropping funnel over a 30 minute period, a mixture composed of 496 g. of a 25 percent solution of dimethylamino-methyl acrylamide, 186 g. acrylamide, 43 g. methyl methacrylate, 45 g. distilled water and 100 g. isopropanol. This incremental addition of reactants is effective in controlling the rate and exothermicity of the reaction. The resulting reaction mixture was maintained at 70°C. for an additional 2 hours, then allowed to cool down and the polymer solution discharged from the reaction vessel. Analysis of the terpolymer product was as follows:

Solids: 28–32 percent
K-value: 129
Relative viscosity: 15.12
Brookfield viscosity: 950 cps
Approx. Molecular Wt.: 60,000

EXAMPLE 2

A solution was prepared by mixing together under stirring, 231.6 g. of acrylamide, 25 g. methyl methacrylate, 640g. of distilled water and 72 g. isopropanol. One-half of the solution thereby obtained was introduced directly into a 2 liter reaction flask provided with a mechanical stirrer, reflux condenser, thermometer and dropping funnel. The remaining half portion was introduced into the dropping funnel. T-butyl peroxypivalate (0.64 g.) was then added to the contents in the reaction flask and the system was throroughly purged with nitrogen and heated to 67°C. Heating was discontinued and the temperature in the reaction vessel rose to 84°C. whereupon the reaction mixture was cooled to 67°C. and the contents in the dropping funnel was introduced into the reaction mixture over a period of 30 minutes. The exothermic nature of the raction caused the temperature to rise to 78°C. The temperature was again restored to 67°C. and maintained constant for one hour. A portion (276 g.) of the resulting polymer solution containing acrylamide — methyl methacrylate was removed for analysis which was as follows:

Solids: 26.87 percent
K-value: 58.5
Rel. Viscosity: 1.972
Brookfield Viscosity (10 percent): 384 cps
Approx. Mol. Weight: at least 45,000

There were then added to the remaining 838 g. of the above polymer solution at a temperature below 30°C., 110.6 g. of 37 percent formaldehyde solution and 166 g. of dimethylamine solution (40 percent) in dropwise fashion over a period of 15 minutes. The resulting reaction mixture was stirred for 2 hours at 65°C. Of the previously polymerized acrylamide, 50 percent was converted to dimethylamino-methyl acrylamide by the interaction of the formaldehyde and dimethylamine (Mannich reaction). Distilled water (350 g.) was then added to the reaction mixture, the system cooled and the polymer solution discharged from the reaction vessel. The analysis of this solution containing the terpolymer is as follows:

Solids: 20.97 percent
K-value: 128.8
Rel. Viscosity: 14.88
Brookfield viscosity (10 percent): 820cps
Approx. Mol Weight: 60,000

EXAMPLE 3

The solids content of the terpolymer solution described in Example 2 was adjusted to 10 percent. A portion of this solution (1000g) was introduced into a 1 gallon stainless steel autoclave and sealed therein. The system was then pressured to 40 p.s.i.g. with methyl chloride and the temperature was raised to 50°C. The pressure in the autoclave peaked at 50 p.s.i.g. The temperature and pressure were maintained for 5 hours, after which the autoclave was cooled to 25°C. and the excess methylchloride was removed by pressurizing with nitrogen and venting three times. Finally the autoclave was opened and the product (the terpolymer quaternized with $CH_3Cl$) was discharged. Analysis of the product was as follows:

Solids: 11.97 percent
K-value: 100.1
Relative Viscosity: 5.661
Brookfield Viscosity(10 percent): 73cps
Approx. Mol. Weight: 75,000

The above quaternized terpolymer displays a remarkable low viscosity while retaining high flocculant activity.

EXAMPLE 4

A mixture of 16.2 g. vinyl acetate, 133.4 g. acrylamide, 25 g. isopropanol and 525 g. distilled water was introduced into a 2 liter reaction flask equipped with a mechanical stirrer, reflux condenser, thermometer and dropping funnel and stirred until a clear solution was formed. The system was then purged with nitrogen and 0.5 g t-butylperoxy pivalate was introduced therein. The reaction mixture was heated to 67°C., heating discontinued and the temperature allowed to rise to 84°C., outside cooling being applied. When the exothermic reaction had subsided, the contents of the dropping funnel, consisting of a solution of 427 g. distilled water, 25 g. isopropanol, 133.6 g. acrylamide and 16.2 g. vinylacetate, were added over a 30 minute period. Following the completion of the addition, the reaction mixture was stirred for an additional hour at 67°C.

There were then added to the thusly formed acrylamide-vinylacetate polymer solution, 60.8 g. formaldehyde (37 percent) and 120.5 g. dimethylamine (35 percent) in dropwise fashion over a period of 15 minutes. The resulting mixture was stirred at 65°C. for 2 hours to effect the Mannich reaction as described in Example 2. The resulting terpolymer solution was cooled and the terpolymer solution recovered. Analysis of the product was as follows:

Solids: 24.36 percent
K-value: 83.2
Rel. Viscosity: 3.565
Brookfield Viscosity(10 percent): 200 cps
Approx. Mol. Weight: 50,000

EXAMPLE 5

There were introduced into a 5 liter flask provided with a mechanical stirrer, reflux condenser, thermometer and dropping funnel, 496 g., as a 25 percent solution, of dimethylamino-methyl acrylamide, 186 g. acrylamide, 44 g. dimethylmaleate, 642 g. distilled water and 100 g. isopropanol. The identical amount of a similar solution was introduced into the dropping funnel. The reaction vessel was purged with nitrogen and then 1.75 g. t-butylperoxy pivalate were introduced. The reaction mixture was heated to 67°C. whereupon heating was discontinued. The exothermic reaction peaked at 82°C. with external cooling. After the reaction had subsided, the solution present in the dropping funnel was added in dropwise fashion within a 30 minute period and the reaction mixture maintained for an additional hour at the same temperature. The terpolymer of the above monomers was formed and the system was cooled down to 25°C. and the terpolymer solution recovered. Analysis of the terpolymer product was as follows:

Solids: 26.50 percent
K-value: 92.6
Rel. Viscosity: 4.541
Brookfield Viscosity (10 percent): 890 cps
Approx. Mol. Weight: 55,000

The terpolymers of the present invention as illustrated by the above examples constitute particularly effective flocculants. This was established utilizing the conventional testing procedures described hereinafter:

FLOCCULATION TEST

There was added to 30 g. of bleached sulfite (or kraft) pulp with 10 percent consistency, 450 mg. standard, air-floated clay filler, and 100 ml distilled water. The resulting mixture was agitated and to the stirred solution, 5 ml of a 1.7 percent size-solution was added. Mixing was continued for 2 minutes and 5 ml of a 1.5 percent solution of papermaker's alum ($Al_2(SO_4)_3 \cdot 18 H_2O$) were added. The resulting mixture was then mixed for 30 minutes at 20 RPM and thereafter diluted to 1,000 ml with water.

A retention-aid solution was prepared by diluting 2.37 g. of the 10 percent flocculant solution of Example 2 with 500 ml of distilled water. A portion of this solution (0.4 ml) was used for a 2 oz. per ton test use and a second portion (1.6 ml) was used for an 8 oz. per ton test. It is to be understood that the terpolymer flocculants of the present invention can be utilized in higher or lower concentrations in the paper pulp mixture. For example, trepolymer concentrations between 0.5 and 15 ounces per ton can be employed, depending on the needs of the user.

Hand stirring of the mixture was carried out for 1 minute and filtering was carried out at house vacuum to form the sheet. The sheet was then removed from the filter and pressed at 500 psig. for 10 seconds. The sheet was then placed between filter papers and felt pads before putting it in a press. The sheet was dried by passing it through a drum drier (surface temperature 235°F.) for 5 minutes and then allowed to stand for 15 minutes to allow the paper sheet to pick up room moisture. A rectangular piece (about 3 inches × 5 inches) was cut therefrom and ashed at 900°C. for 4 hours. The ash contained no black spots indicating that the ashing of the paper sheet was complete and that the pulp mixture was flocculated so that all of the filler was laid down on the surface of the paper. The other terpolymers illustrated herein can be substituted for the acrylamidedimethylamino-methyl acrylamide- methyl methacrylate terpolymer of Example 2 to provide substantially complete flocculation of the pulp mixture and equally satisfactory ash tests. Omission of the terpolymer flocculant results in much lower amount of ash since the pulp mixture is inadequately flocculated and much of the filler remains in suspension instead of being deposited on the surface of the paper. Thus, a substantial portion of the filler is removed in the wash water instead of being incorporated in the paper composition.

SLUDGE TREATMENT

There were added to 200 ml of sludge (municipal sludge containing 84.2 g. of filterable solids per liter), 30 ml of a 1 percent flocculant solution of the terpolymer of Example 3 which has been quaternized. The sludge was mixed with the flocculant for 30 seconds and then poured into a 9 cm Buchner funnel covered with a No. 1 Whatman Brand filter paper. Vacuum filtration was carried out at 22mm/Hg for a period of 120 seconds to test the improvement in filterability of the sludge containing the flocculant. The efficiency of the terpolymer flocculant is expressed by the formula:

$$\frac{\text{ml of filtrate}}{\text{filtration time}} = \text{Flocculant Efficiency}$$

In the above test, the efficiency of the quaternized terpolymer of Example 3 was 200/120 or a value of 1.67.

By way of comparisson, 30 ml of a 1 percent flocculant solution of Magnifloc 521C* was substituted in the above test and the procedure described above was repeated. Only 80 ml of the sludge could be filtered in the same period of time. Thus the efficiency of this flocculant was 80/120 or 0.67.

*High molecular weight, cationic modified polymer of acrylamide commercially produced by American Cyanamid Company It is apparent that the present terpolymers provide an improvement in a greater order of magnitude and that the presence of the third monomer in the terpolymeric composition actively contributes to the improvement obtained.

It is to be understood that any of the terpolymer quaternized derivatives heretofore described can be substituted in the above sludge treatment to provide excellent results of marked superiority.

Generally the terpolymers of the present invention can be added to aqueous suspensions for separation of finely divided solids therefrom and the terpolymers or their quaternized derivatives employed as aqueous treating solutions, preferably in a water solution, wherein the concentration of the terpolymer or the quaternized derivative in the solution is between about 0.01 percent and 10 percent by weight.

We claim:

1. A water soluble terpolymer of a) about 20–50 weight percent acrylamide, b) about 45–75 weight percent dimethylamino-methylacrylamide and c) about 5–25 weight percent of a third ethylenically unsaturated monomer selected from the group consisting of acrylonitrile, vinyl acetate, vinyl-isobutylether, chloroprene, dimethylmaleate, diethylmaleate, allyl acetate, methylacrylate, ethylacrylate, methyl methacrylate, and 2-vinyl pyridine said termonomer having lower solubility in water than either (a) or (b); the value of (a), (b) and (c) being such that the total monomers present amount to 100 percent and the number average molecular weight of the terpolymer being greater than 30,000.

2. A water soluble, high molecular weight terpolymer according to claim 1, wherein said third ethylenically unsaturated monomer is methyl methacrylate.

3. A water soluble, high molecular weight terpolymer according to claim 1 consisting essentially of dimethylamino-methyl acrylamide, acrylamide and dimethylmaleate.

4. A water soluble, high molecular weight terpolymer according to claim 1 consisting essentially of dimethylamino-methyl acrylamide, acrylamide and vinylacetate.

5. A water soluble, high molecular weight terpolymer according to claim 1 consisting essentially of dimethylamino-methyl acrylamide, acrylamide and methyl methacrylate.

6. A water soluble, high molecular weight terpolymer according to claim 1 in the form of its quaternary compound obtained by reacting the terpolymer with a quaternizing agent selected from the group consisting of alkyl halides, aryl halides and dialkyl sulfates.

7. A water soluble, high molecular weight terpolymer according to claim 6 in the form of its quaternary compound with $CH_3Cl$.

8. A water soluble, high molecular weight terpolymer according to claim 1 consisting essentially of the methyl chloride quaternary derivative of the terpolymer of acrylamide, dimethylamino-methyl acrylamide and methyl methacrylate.

9. A water soluble, high molecular weight terpolymer according to claim 1 wherein the terpolymer has a molecular weight in excess of 30,000 and a shear viscosity less than 10,000cps.

10. A water soluble, high molecular weight terpolymer according to claim 1 wherein the terpolymer has a molecular weight between 50,000 and 900,000 and a shear viscosity less than 10,000 cps.

11. A water soluble, high molecular weight terpolymer according to claim 1 in the form of its aqueous solution.

* * * * *